United States Patent
Hoff et al.

(10) Patent No.: US 10,698,857 B2
(45) Date of Patent: Jun. 30, 2020

(54) SYSTEMS, METHODS, AND APPARATUS TO SYNCHRONIZE DATA BUS ACCESS

(71) Applicant: Bristol Inc., Houston, TX (US)

(72) Inventors: William Hoff, Naugatuck, CT (US); Paul Joseph LeBlanc, Watertown, CT (US); Fred DiNicola, Watertown, CT (US)

(73) Assignee: BRISTOL, INC, Houston, TX (US)

( * ) Notice: Subject to any disclaimer, the term of this patent is extended or adjusted under 35 U.S.C. 154(b) by 28 days.

(21) Appl. No.: 16/151,855

(22) Filed: Oct. 4, 2018

(65) Prior Publication Data
US 2020/0104273 A1 Apr. 2, 2020

Related U.S. Application Data
(60) Provisional application No. 62/738,440, filed on Sep. 28, 2018.

(51) Int. Cl.
*G06F 13/42* (2006.01)
*G06F 13/10* (2006.01)
(Continued)

(52) U.S. Cl.
CPC ............ *G06F 13/4291* (2013.01); *G06F 1/14* (2013.01); *G06F 13/102* (2013.01)

(58) Field of Classification Search
CPC ............ G06F 13/42; G06F 1/14; G06F 13/10
(Continued)

(56) References Cited

U.S. PATENT DOCUMENTS

| | | | | | |
|---|---|---|---|---|---|
| 5,434,997 A | * | 7/1995 | Landry | ............... | G06F 11/1637 709/208 |
| 6,028,849 A | * | 2/2000 | Niot | ..................... | H04B 7/2671 370/280 |

(Continued)

FOREIGN PATENT DOCUMENTS

CN 107040327 8/2017

OTHER PUBLICATIONS

International Searching Authority, "International Search Report", issued in connection with International Patent Application No. PCT/US2019/052870, dated Nov. 6, 2019, (5 pages).

(Continued)

*Primary Examiner* — Christopher B Shin
(74) *Attorney, Agent, or Firm* — Hanley, Flight & Zimmerman, LLC

(57) ABSTRACT

Methods, apparatus, systems, and articles of manufacture are disclosed to synchronize data bus access. An example system includes a first computing device to transmit a first synchronization pulse to second computing devices using a first bus, the first synchronization pulse to synchronize first timers of the second computing devices to trigger a data schedule including one or more data cycles, and transmit a second synchronization pulse to the second computing devices using the first bus, the second synchronization pulse to synchronize ones of the first timers and slot counters of the second computing devices to trigger the one or more data cycles. The example system further includes the second computing devices to transmit data to the first computing device using a second bus during the one or more data cycles, where each of the one or more data cycles is assigned to a corresponding one of the second computing devices.

20 Claims, 7 Drawing Sheets

(51) Int. Cl.
 *G06F 1/14* (2006.01)
 *G06F 13/00* (2006.01)

(58) Field of Classification Search
 USPC .......................................................... 710/61
 See application file for complete search history.

(56) References Cited

U.S. PATENT DOCUMENTS

| | | | | |
|---|---|---|---|---|
| 6,046,709 | A * | 4/2000 | Shelton | G06F 3/1446 |
| | | | | 345/1.1 |
| 6,128,318 | A | 10/2000 | Sato | |
| 6,502,155 | B1 * | 12/2002 | Kondo | G06F 1/14 |
| | | | | 455/403 |
| 6,505,304 | B1 * | 1/2003 | Ozawa | G06F 1/14 |
| | | | | 710/61 |
| 6,959,017 | B2 * | 10/2005 | Nakai | H04J 3/0655 |
| | | | | 370/503 |
| 7,827,455 | B1 * | 11/2010 | Eckel | G06F 13/4072 |
| | | | | 365/201 |
| 8,121,240 | B1 * | 2/2012 | Dalvi | H04L 1/205 |
| | | | | 375/371 |
| 2006/0224372 | A1 * | 10/2006 | Ban | G06F 30/33 |
| | | | | 703/13 |
| 2007/0209442 | A1 * | 9/2007 | Takahashi | G01F 1/36 |
| | | | | 73/714 |
| 2010/0054282 | A1 | 3/2010 | Schirmer et al. | |
| 2012/0200719 | A1 * | 8/2012 | Kishi | G03B 9/64 |
| | | | | 348/207.11 |
| 2018/0340803 | A1 * | 11/2018 | Imokawa | G01R 31/3191 |
| 2019/0102328 | A1 * | 4/2019 | Tailliet | G06F 13/1668 |
| 2019/0173597 | A1 | 6/2019 | Zhang et al. | |

OTHER PUBLICATIONS

International Searching Authority, "Written Opinion", issued in connection with International Patent Application No. PCT/US2019/052870, dated Nov. 6, 2019, (8 pages).

* cited by examiner

SYSTEMS, METHODS, AND APPARATUS TO SYNCHRONIZE DATA BUS ACCESS

RELATED APPLICATION

This patent arises from an application claiming the benefit of U.S. Provisional Patent Application Ser. No. 62/738,440, which was filed on Sep. 28, 2018. U.S. Provisional Patent Application Ser. No. 62/738,440 is hereby incorporated herein by reference in its entirety. Priority to U.S. Provisional Patent Application Ser. No. 62/738,440 is hereby claimed.

FIELD OF THE DISCLOSURE

This disclosure relates generally to computers and, more particularly, to systems, methods, and apparatus to synchronize data bus access.

BACKGROUND

In computer networks, a channel access method, or a multiple access method, allows more than two terminals connected to the same transmission medium, or communication channel, to transmit data over the medium and share the capacity of the medium. Examples of shared physical mediums are bus networks, ring networks, wireless networks, and point-to-point links operating in half-duplex mode. A channel access method is based on multiplexing that allows several data streams or signals to share the same communication channel. Terminals using the same transmission medium need to be synchronized to avoid data collisions.

SUMMARY

Systems, methods, and apparatus to synchronize data bus access are disclosed herein. In some disclosed examples, an example system includes a first computing device to transmit a first synchronization pulse to second computing devices using a first bus, the first synchronization pulse based on a real-time clock associated with the first computing device, the first synchronization pulse to synchronize first timers of the second computing devices to trigger a data schedule including one or more data cycles, and transmit a second synchronization pulse to the second computing devices using the first bus, the second synchronization pulse based on a second timer associated with the first computing device, the second synchronization pulse to synchronize ones of the first timers and slot counters of the second computing devices to trigger the one or more data cycles. The example system further includes the second computing devices to transmit data to the first computing device using a second bus during the one or more data cycles, where each of the one or more data cycles is assigned to a corresponding one of the second computing devices, the second bus different from the first bus.

In some disclosed examples, a non-transitory computer readable storage medium comprising instructions is disclosed. In some disclosed examples, the instructions, when executed, cause a machine to at least transmit a first synchronization pulse from a first computing device to second computing devices using a first bus, the first synchronization pulse based on a real-time clock associated with the first computing device, synchronize first timers of the second computing devices to the first synchronization pulse to trigger a data schedule including one or more data cycles, transmit a second synchronization pulse from the first computing device to the second computing devices using the first bus, the second synchronization pulse based on a second timer associated with the first computing device, synchronize ones of the first timers and slot counters of the second computing devices to the second synchronization pulse trigger the one or more data cycles, and transmit data from the second computing devices to the first computing device using a second bus during the one or more data cycles, where each of the one or more data cycles is assigned to a corresponding one of the second computing devices, the second bus different from the first bus.

In some disclosed examples, an example method includes transmitting a first synchronization pulse from a first computing device to second computing devices using a first bus, the first synchronization pulse based on a real-time clock associated with the first computing device, synchronizing first timers of the second computing devices to the first synchronization pulse to trigger a data schedule including one or more data cycles, transmitting a second synchronization pulse from the first computing device to the second computing devices using the first bus, the second synchronization pulse based on a second timer associated with the first computing device, synchronizing ones of the first timers and slot counters of the second computing devices to the second synchronization pulse trigger the one or more data cycles, and transmitting data from the second computing devices to the first computing device using a second bus during the one or more data cycles, where each of the one or more data cycles is assigned to a corresponding one of the second computing devices, the second bus different from the first bus.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
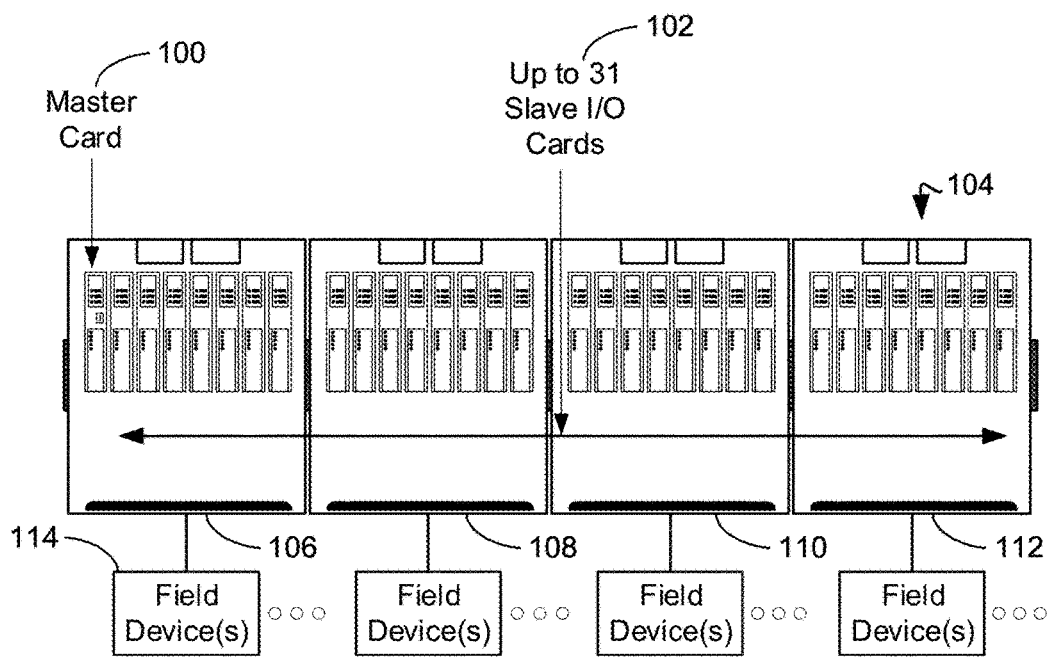
FIG. 1 depicts typical programmable computing devices including an example controller and example I/O modules electrically in circuit with each other in an example rack.

Process control systems such as distributed control systems are growing increasingly complex as individual components with increased data acquisition resolution, processing power and signal conditioning are developed. A distributed control system (DCS) is used to monitor and/or to control different aspects of an operation to be conducted in a process control environment such as, for example, manufacturing components, processing raw chemical materials, etc. A DCS typically includes one or more controllers (e.g., electronic controllers, programmable controllers, etc.) with one or more accompanying input/output (I/O) modules, which allow the one or more controllers to acquire signals from various input field devices and/or instruments and control various output field devices and/or instruments. An I/O module may include inputs, outputs, and/or a combination thereof.

As used herein, the terms "field device" or "instrument" refer to control devices such as, for example, actuators, actuator assemblies, actuator controllers, actuator positioners, fluid flow control assemblies, sensors, transmitters, valve assemblies, etc., that may be used throughout a process control system to measure and/or control different aspects (e.g., other process control devices, etc.) of the process control system.

In some instances, a controller is electrically in circuit with a plurality of I/O modules on one or more common buses (e.g., a power bus, a communication bus, etc.). For example, a controller may be communicatively coupled to I/O modules on a data communication bus or an I/O bus. In such examples, data collisions associated with two or more of the I/O modules sending data to the controller at the same time on the same I/O bus can occur. To reduce the data collisions, the controller can instruct the I/O modules to send data to the controller based on time-division multiple access (TDMA).

In prior examples, the controller provides different time slots to different I/O modules in a cyclically repetitive frame structure. For example, a first I/O module may use a first time slot, a second I/O module may use a second time slot after the first time slot, etc., until the last I/O module when the cycle repeats. In prior examples, data collisions occur due to clock drift or clock wandering associated with the I/O modules with respect to the controller. For example, clock drift can occur where clocks used by the I/O modules drift apart and/or gradually desynchronize from a real time clock used by the controller. In such examples, each I/O module has its own clock source that can drift at a different rate compared to the other I/O modules and the controller.

In prior examples, the controller implements a fixed-rate TDMA data bus that does not allow slowing down the data bus in low-power applications. For example, in some process control environments, such as explosive-atmosphere environments (e.g., a chemical plant, an oil-rig, etc.), electrical devices that use power above a specified threshold can create electrical sparks that can ignite the explosive atmosphere and cause an explosion. In prior examples, variable-rate TDMA data bus implementations are hardware-based solutions that require computationally and financially expensive hardware. For example, the hardware utilized by the hardware-based solutions are not field upgradeable as the hardware is fixed in place (e.g., soldered onto a printed-circuit board). In such examples, upgrades to the hardware-based solutions can require complete hardware replacements when the hardware becomes obsolete and no longer produced and/or supported by a manufacturer of the hardware.

Examples disclosed herein synchronize real-time data collection from asynchronous I/O modules to reduce and/or otherwise eliminate data collisions caused by clock drift. Examples disclosed herein include an example bus synchronizer to synchronize access to a variable rate I/O bus, where the access is based on TDMA. In some disclosed examples, the bus synchronizer instructs a logic device such as a complex programmable logic device (CPLD) to generate synchronization pulses of different pulse widths to initiate a data schedule and corresponding data cycles.

In some disclosed examples, the bus synchronizer invokes the logic device to generate a first clock pulse using a real-time clock associated with the controller as a reference clock. The logic device can generate the first clock pulse as having a first pulse width of one or more clock cycles. The logic device can propagate the first clock pulse on a shared bus to I/O modules communicatively coupled to the controller to reset central processing unit (CPU) timers of the I/O modules. In some disclosed examples, the bus synchronizer invokes the logic device to generate a second clock pulse having a second pulse width of one or more clock cycles. The logic device can propagate the second clock pulse to the I/O modules on the shared bus to reset the CPU timers and slot counters of the I/O modules. By resetting the CPU timers and the slot counters of the I/O modules in response to receiving the second clock pulses, the I/O modules can be synchronized to the real-time clock of the controller and mitigate effects of clock drift of the I/O modules that occurs between I/O cycles.

FIG. 1 depicts typical programmable computing devices 100, 102 including an example controller 100 and example I/O modules (e.g., I/O devices) 102 electrically in circuit with each other in an example rack 104. In FIG. 1, the controller 100 is a first computing device (e.g., a device including one or more processors executing computer readable instructions, a programmable logic controller, etc.) that performs data acquisition and control operations such as obtaining and processing I/O data (e.g., sensor measurements, status values, etc.), transmitting I/O commands (e.g., a command to open a valve, close a valve, etc.), transmitting the I/O data and/or the I/O commands to an external controller and/or DCS, etc. Alternatively, the controller 100 may correspond to more than one CPU.

In FIG. 1, the rack 104 includes four example baseplates 106, 108, 110, 112 including a first example baseplate 106, a second example baseplate 108, a third example baseplate 110, and a fourth example baseplate 112. The baseplates 106, 108, 110, 112 each include I/O modules 102. In the illustrated example of FIG. 1, the first baseplate 106 includes the controller 100 and seven I/O modules 102. In FIG. 1, the second through fourth baseplates 108, 110, 112 each include eight I/O modules 102. Alternatively, one or more of the second through fourth baseplates 108, 110, 112 may have a controller such as the controller 100 of the first baseplate 106. Alternatively, the first through fourth baseplates 106, 108, 110, 112 may have a different quantity of I/O modules 102 than depicted in FIG. 1. Alternatively, one or more of the first through fourth baseplates 106, 108, 110, 112 may be capable of having fewer or more than eight total card slots (e.g., a card slot capable of receiving a controller or I/O module).

In the illustrated example of FIG. 1, the I/O modules 102 are second computing devices (e.g., a device including one or more processors executing computer readable instructions, a programmable logic controller, a remote terminal unit (RTU), etc.) that each include one or more input and/or output channels for the controller 100. In FIG. 1, the I/O modules 102 are RTUs. Alternatively, one or more of the I/O modules 102 may be a different type of computing device. In FIG. 1, each of the I/O modules 102 includes a CPU to control the one or more input and/or output channels. For example, each one of the I/O modules 102 may include one or more analog input and/or output channels, one or more digital input and/or output channels, one or more relay channels, etc. Each of the I/O modules 102 may include analog-to-digital (A/D) conversion circuitry, signal isolation circuitry, etc., to support one or more inputs and/or outputs. For example, a first one of the I/O modules 102 may include analog inputs that can convert 4-20 milliamp measurements obtained from example field devices 114 into corresponding digital values (e.g., a value ranging from 0-65535 for a 16-bit A/D converter, etc.). The controller 100 may obtain the digital value from the first one of the I/O modules 102 via a shared bus (e.g., a common bus, a communication bus, etc.).

In FIG. 1, the field devices 114 are sensors. For example, the first one of the field devices 114 may be a pressure transducer that converts a pressure measurement into a 4-20 milliamp electrical output. Alternatively, any other type of field device may be used. For example, one or more of the field devices 114 may be position sensors, switches (e.g., filter switches, position switches, pressure switches, etc.), etc. In other examples, one or more of the field devices 114 may be a fluid flow control assembly, a motor, a pump, etc. In FIG. 1, the field devices 114 operate in a process control environment. For example, the process control environment can correspond to a process industry environment or system including a chemical plant, a manufacturing facility, an oilfield environment, a factory, etc.

Figure 2:
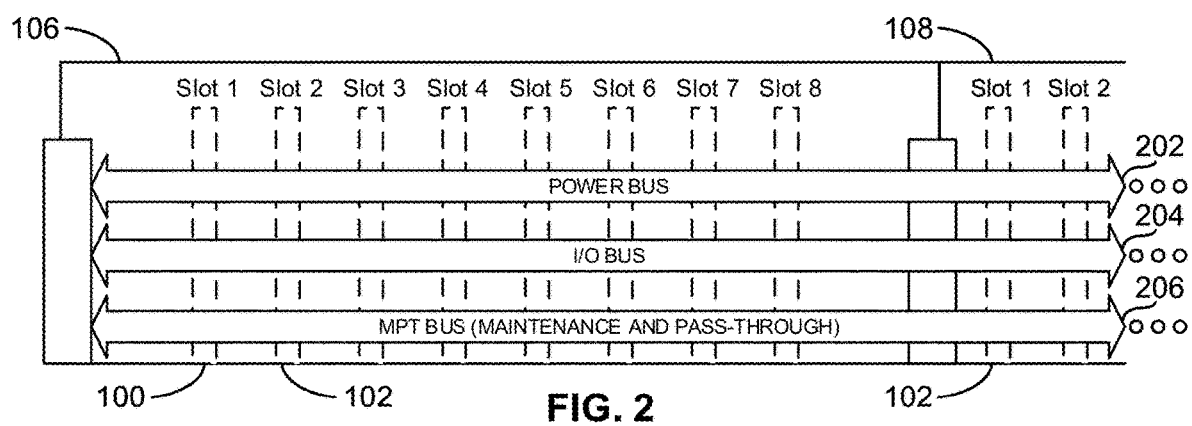
FIG. 2 is a schematic illustration of the programmable computing devices of FIG. 1 communicatively coupled to each other on an example shared power bus, an example shared I/O bus, and an example shared maintenance bus.

FIG. 2 is a schematic illustration of the programmable computing devices 100, 102 of the first baseplate 106 of FIG. 1 communicatively coupled to each other and to at least the I/O modules 102 of the second baseplate 108 on example buses 202, 204, 206. In FIG. 2, the buses include a first example bus 202, a second example bus 204, and a third example bus 206. In FIG. 2, the controller 100 and the I/O modules 102 are electrically coupled to each other via the buses 202, 204, 206. Similarly, the controller 100 and the I/O modules 102 of the first baseplate 106 are electrically coupled to each of the I/O modules 102 of the second through fourth baseplates 108, 110, 112 via the buses 202, 204, 206.

In the illustrated example of FIG. 2, the first bus 202 is a power bus (e.g., a common power bus, a shared power bus, etc.). For example, the first bus 202 may be an electrical interface used to provide power to the controller 100 and the I/O modules 102. In such examples, the first bus 202 can correspond to a 24 Volt (V) power bus. Alternatively, the first bus 202 may correspond to any other voltage or power level.

In FIG. 2, the second bus 204 is an I/O bus (e.g., a common I/O bus, a shared I/O bus, etc.). For example, the second bus 204 may be used by the controller 100 to request I/O data from the I/O modules 102 and for the I/O modules 102 to send I/O data to the controller 100. In FIG. 2, the second bus 204 is an RS-485 electrical interface. Alternatively, the second bus 204 may correspond to any other electrical interface using an asynchronous serial communication protocol, a synchronous serial communication protocol, etc.

In FIG. 2, the third bus 206 is a maintenance bus (e.g., a common maintenance bus, a shared maintenance bus, etc.). For example, the third bus 206 may be an RS-485 electrical interface used by the controller 100 to configure the I/O modules 102. In such examples, the controller 100 can use the third bus 206 to configure one or more of the I/O modules 102 by assigning an I/O bus rate or an acquisition rate (e.g., acquire data from the field devices 114 every 20 milliseconds, 100 ms, etc.), a response rate (e.g., send data to the controller 100 every 20 milliseconds (ms), 100 ms, etc.), a data throughput rate (e.g., 1 Mega-bits per second (MBPS), 2 MBPS, 3 MBPS, etc.), etc., of the I/O modules 102. For example, the controller 100 may configure the I/O bus rate of each of the I/O modules 102 by sending configuration commands, data, instructions, etc., to the I/O modules 102 using the third bus 206.

Figure 3:
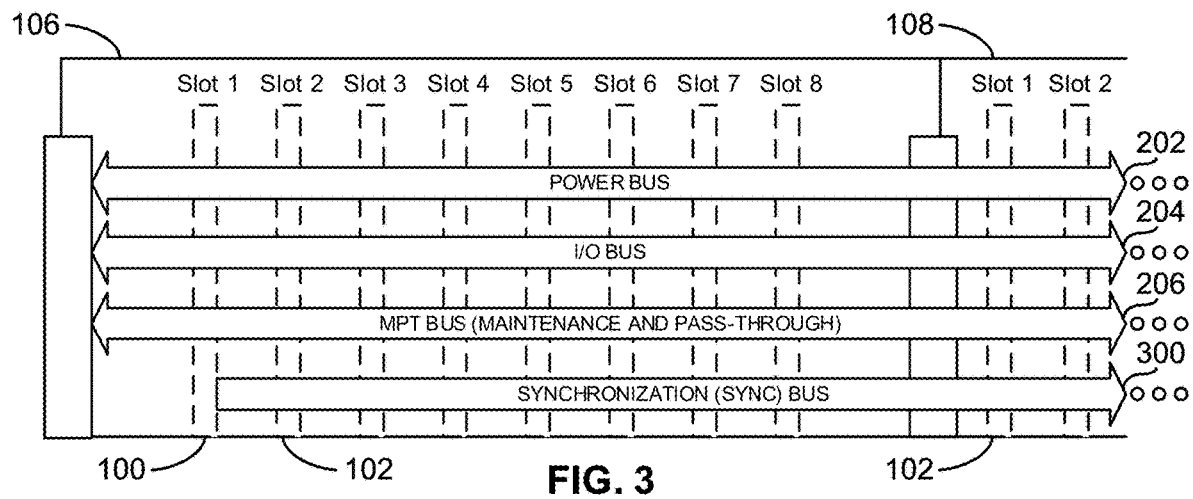
FIG. 3 is a schematic illustration of the programmable computing devices of FIG. 1 communicatively coupled to each other on a shared synchronization bus.

FIG. 3 is a schematic illustration of the programmable computing devices 100, 102 of the first baseplate 106 of FIGS. 1-2 communicatively coupled to each other and to at least the I/O modules 102 of the second baseplate 108 on the first through third buses 202, 204, 206 and an example fourth bus 300. In FIG. 3, the fourth bus 300 is a synchronization bus (SYNC bus) 300. For example, the fourth bus 300 may correspond to one or more electrical pins of the controller 100 and the I/O modules 102 that are electrically coupled to each other via common or shared electrical conductor(s). In the illustrated example of FIG. 3, the controller 100 uses the fourth bus 300 to synchronize acquisition of real-time I/O data from the I/O modules 102 using TDMA on an RS-485 electrical interface. For example, the controller 100 may obtain I/O data from the I/O modules 102 on the second bus 204 in response to synchronizing the I/O modules 102 using the fourth bus 300.

In the illustrated example of FIG. 3, the controller 100 synchronizes a start of a data schedule and start(s) of one or more corresponding data cycles via the fourth bus 300. As used herein, a data schedule can refer to a data acquisition task that spans a time duration during which one or more data cycles are executed. As used herein, a data cycle can refer to a data acquisition task that spans a time duration during which I/O data is retrieved, obtained, and/or otherwise collected from each of the I/O modules 102 communicatively coupled to the controller 100.

In some examples, the controller 100 triggers and/or otherwise initiates a data schedule via the fourth bus 300. For example, the controller 100 may instruct a first logic device (e.g., a CPLD, a digital signal processor (DSP), etc.) to generate and transmit a first synchronization pulse to second logic devices (e.g., CPLDs, DSPs, etc.) that are associated with the I/O modules 102 via the fourth bus 300. In such examples, the second logic devices can generate and transmit one of first interrupts (e.g., a start of schedule interrupt, a schedule interrupt, etc.) to CPUs of the I/O modules 102. In response to receiving one of the first interrupts, each of the CPUs of the I/O modules 102 can synchronize one or more CPU timers (e.g., a 1 millisecond (ms) CPU timer) included in the CPUs to one of the first interrupts by resetting the one or more CPU timers. The start of the data schedule is synchronized with the resetting of the one or more CPU timers of the I/O modules 102.

In some examples, the controller 100 triggers and/or otherwise initiates one or more data cycles via the fourth bus 300 when the data schedule has been triggered. For example, the controller 100 may instruct the first logic device to generate and transmit a second synchronization pulse to the second logic devices via the fourth bus 300. In such examples, the second logic devices can generate and transmit one of second interrupts (e.g., a start of data cycle interrupt, a data cycle interrupt, etc.) to the I/O modules 102. In response to receiving one of the second interrupts, each of the I/O modules 102 synchronizes at least one of (1) the one or more CPU timers included in the CPUs of the I/O modules 102 and (2) one or more slot counters included in the CPUs of the I/O modules 102 to one of the second interrupts by resetting the one or more CPU timers and the one or more slot counters. The starts of the one or more data cycles are synchronized with the resetting of the one or more CPU timers and/or the one or more slot counters of the I/O modules 102.

In the illustrated example of FIG. 3, each of the I/O modules 102 transmits I/O data to the controller 100 using TDMA based on a value of a slot counter included in the CPU of the I/O modules 102. For example, a CPU timer included in the CPU of the I/O modules 102 may be synchronized to the real-time clock associated with the controller 100. In such examples, a slot counter can be operated based on the synchronized CPU timer. For example, the slot counter may be decremented or incremented by determining a quantity of clock pulses executed by the synchronized CPU timer.

In FIG. 3, only one I/O module 102 transmits or executes a process of transmitting I/O data to the controller 100 at a time to prevent data collisions. Each of the I/O modules 102 transmits data to the controller 100 during an assigned data cycle. For example, the controller 100 may initiate a data schedule during a first data cycle, where the data schedule corresponds to a plurality of data cycles including the first data cycle. The I/O module 102 coupled to Slot 2 may transmit I/O data to the controller 100 during a second data cycle after the first data cycle. The I/O module 102 coupled to Slot 3 may transmit I/O data to the controller 100 during a third data cycle, and so on.

In FIG. 3, the data cycle during which the corresponding I/O module 102 transmits data to the controller 100 is based on a value of the slot counter. For example, the slot counters of the I/O modules 102 may be offset from each other. For example, when the slot counters of the I/O modules 102 are reset in response to the second interrupts, the slot counter of the I/O module 102 coupled to Slot 2 may be reset to 0. In such examples, the slot counter of the I/O module 102 coupled to Slot 3 can be reset to 600 microseconds (us), the slot counter of the I/O module 102 coupled to Slot 4 can be reset to 1200 us, etc. For example, the I/O module 102 coupled to Slot 3 may transmit I/O data to the controller 100 when the slot counter of the I/O module 102 coupled to Slot 3 counts down from 600 us to 0 us. Advantageously, by resetting the slot counters in response to the second interrupt, the offset associated with the slot counters of the I/O modules 102 can ensure that data collisions do not occur.

Figure 4:
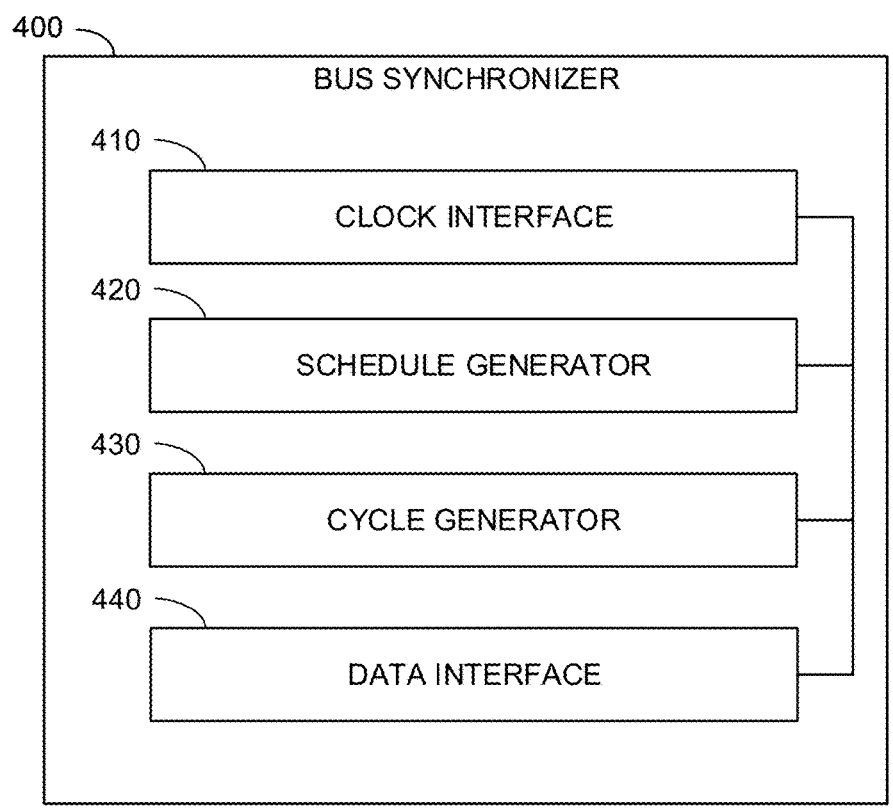
FIG. 4 is a block diagram of an example implementation of an example bus synchronizer to synchronize input/output (I/O) data collection from the programmable computing devices of FIG. 1.

FIG. 4 is a block diagram of an example implementation of an example bus synchronizer 400 to synchronize I/O data collection from the I/O modules 102 of FIGS. 1-3. In some examples, the bus synchronizer 400 is implemented by the controller 100 of FIGS. 1-3. In some examples, the bus synchronizer 400 triggers and/or otherwise initiates a data schedule via the fourth bus 300 of FIG. 3. In some examples, the bus synchronizer 400 triggers and/or otherwise initiates one or more data cycles via the fourth bus 300 when the data schedule has been triggered. In the illustrated example of FIG. 4, the bus synchronizer 400 includes an example clock interface 410, an example schedule generator 420, an example cycle generator 430, and an example data interface 440.

In the illustrated example of FIG. 4, the bus synchronizer 400 includes the clock interface 410 to obtain a value from a real-time clock that can be used as a reference when triggering a data schedule. In some examples, the clock interface 410 includes means to query a real-time clock included in a CPU or external to the CPU for a value of the real-time clock. In some examples, the clock interface 410 transmits the value of the real-time clock to the schedule generator 420 to initiate a data schedule. In some examples, the clock interface 410 includes means to query a counter, timer, etc., included in the CPU for a value of the counter, the timer, etc. In some examples, the clock interface 410 transmits the value of the counter, the timer, etc., to the cycle generator 430 to initiate one or more data cycles.

In some examples, the clock interface 410 invokes hardware included in the controller 100 to perform an operation. For example, the clock interface 410 may invoke a CPU included in the controller 100 to query the real-time clock. In other examples, the clock interface 410 can direct the CPU to transmit a value of the real-time clock to a logic device included in the controller 100 to trigger a data schedule. In yet other examples, the clock interface 410 can instruct the CPU to transmit a value of a CPU timer associated with the CPU to the logic device included in the controller 100 to trigger one or more data cycles of the data schedule.

In the illustrated example of FIG. 4, the bus synchronizer 400 includes the schedule generator 420 to generate and transmit pulses having a pulse width of one or more clock cycles on the fourth bus 300 based on the value of the real-time clock. In some examples, the schedule generator 420 includes means to encode a pulse corresponding to one or more clock cycles on the fourth bus 300. For example, the schedule generator 420 may encode a 4340 nanosecond (ns) wide pulse (e.g., a pulse width corresponding to thirty-two 7.3728 Mega-hertz (MHz) clock cycles) on the fourth bus 300. In such examples, logic devices associated with the I/O modules 102 can asynchronously sample the 4340 ns wide pulse and transmit a start of schedule interrupt to CPUs included in the I/O modules 102. The CPUs can resynchronize CPU timers included in the CPUs to the start of schedule interrupt. Alternatively, the schedule generator 420 may encode a pulse having any other width on the fourth bus 300.

In some examples, the schedule generator 420 invokes hardware included in the controller 100 perform an operation. For example, the schedule generator 420 may invoke the CPU included in the controller 100 to generate and transmit a start of schedule pulse to a logic device included in the controller 100. In such examples, the schedule generator 420 can direct the logic device to encode the pulse on the fourth bus 300 based on a clock source (e.g., a master clock source) of the controller 100.

In the illustrated example of FIG. 4, the bus synchronizer 400 includes the cycle generator 430 to generate and transmit pulses on the fourth bus 300 based on the value of a counter (e.g., a CPU counter), a timer (e.g., a CPU timer), etc., obtained by the clock interface 410. In some examples, the cycle generator 430 includes means to encode a pulse with a pulse width corresponding to one or more clock cycles on the fourth bus 300. For example, the cycle generator 430 may encode a 1085 ns wide pulse (e.g., a pulse width corresponding to eight 7.3728 MHz clock cycles) on the fourth bus 300. In such examples, the logic devices associated with the I/O modules 102 can asynchronously sample the 1085 ns wide pulse and transmit a start of cycle interrupt to the CPUs included in the I/O modules 102. The CPUs can resynchronize CPU timers and/or slot counters associated with the CPUs to the start of cycle interrupt. Alternatively, the cycle generator 430 may encode a pulse having any other width on the fourth bus 300.

In some examples, the cycle generator 430 invokes hardware included in the controller 100 to perform an operation. For example, the cycle generator 430 may invoke the CPU included in the controller 100 to generate and transmit a start of cycle pulse to a logic device included in the controller 100. In such examples, the cycle generator 430 can direct the logic device to encode the pulse on the fourth bus 300 based on the clock source of the controller 100.

In the illustrated example of FIG. 4, the bus synchronizer 400 includes the data interface 440 to obtain I/O data from the I/O modules 102 based on TDMA. In some examples, the data interface 440 includes means to obtain the I/O data from the I/O modules 102 via the second bus 204 of FIGS. 2-3. For example, the data interface 440 may obtain I/O data from a first one of the I/O modules 102 on Slot 2 during a first data cycle of a data schedule, I/O data from a second one of the I/O modules 102 on Slot 3 during a second data cycle of the data schedule, etc., by using the second bus 204, where the second data cycle is after the first data cycle. In some examples, the data interface 440 invokes the CPU included in the controller 100 to obtain the I/O data from the I/O modules 102.

While an example manner of implementing the bus synchronizer 400 is illustrated in FIG. 4, one or more of the elements, processes, and/or devices illustrated in FIG. 4 may be combined, divided, re-arranged, omitted, eliminated, and/or implemented in any other way. Further, the example clock interface 410, the example schedule generator 420, the example cycle generator 430, the example data interface 440, and/or, more generally, the example bus synchronizer 400 of FIG. 4 may be implemented by hardware, software, firmware, and/or any combination of hardware, software, and/or firmware. Thus, for example, any of the example clock interface 410, the example schedule generator 420, the example cycle generator 430, the example data interface 440, and/or, more generally, the example bus synchronizer 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), field programmable gate array(s) (FPGA(s)), and/or RTUs. When reading any of the apparatus or system claims of this patent to cover a purely software and/or firmware implementation, at least one of the example clock interface 410, the example schedule generator 420, the example cycle generator 430, and/or the example data interface 440 is/are hereby expressly defined to include a non-transitory computer readable storage device or storage disk such as a memory, a digital versatile disk (DVD), a compact disk (CD), a Blu-ray disk, etc., including the software and/or firmware. Further still, the example bus synchronizer 400 of FIG. 4 may include one or more elements, processes, and/or devices in addition to, or instead of, those illustrated in FIG. 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
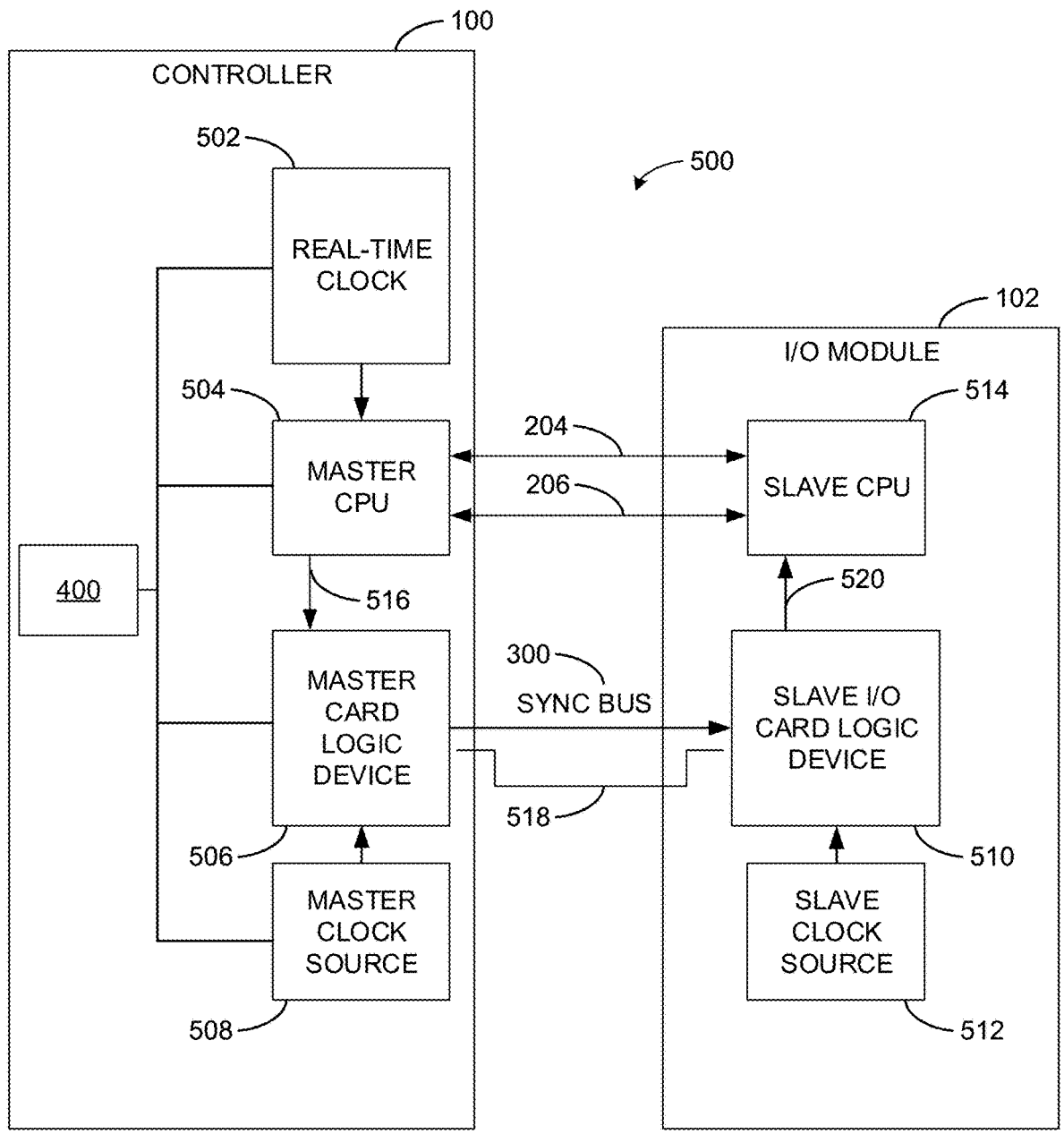
FIG. 5 depicts a block diagram of an example bus synchronization system including the bus synchronizer of FIG. 4 to synchronize a start of a data schedule.

FIG. 5 depicts a block diagram of an example bus synchronization system 500 including the bus synchronizer 400 of FIG. 4 to synchronize a start of a data schedule. The bus synchronization system 500 of FIG. 5 includes the controller 100 of FIGS. 1-3 and one of the I/O modules 102 of FIGS. 1-3. Additionally or alternatively, the bus synchronization system 500 may include more than one of the I/O modules 102 of FIGS. 1-3. In the illustrated example of FIG. 5, the controller 100 includes the bus synchronizer 400 of FIG. 4, an example real-time clock 502, an example master CPU 504, an example master card logic device 506, and an example master clock source 508. In the illustrated example of FIG. 5, the I/O module 102 includes an example slave I/O card logic device 510, an example slave clock source 512, and an example slave CPU 514.

In the illustrated example of FIG. 5, the master CPU 504 includes one or more processors. In FIG. 5, the master CPU 504 obtains a value of the real-time clock 502 to use as a reference when initiating a data schedule. For example, the clock interface 410 of FIG. 4 may direct the master CPU 504 to obtain the value of the real-time clock 502. In FIG. 5, the master CPU 504 generates and transmits an example start of schedule pulse 516 to the master card logic device 506 at a specified frequency. For example, the schedule generator 420 of FIG. 4 may direct the master CPU 504 to generate and transmit the start of schedule pulse 516 at a frequency of once per second. Alternatively, the master CPU 504 may generate and transmit a start of schedule pulse to the master card logic device 506 at a different frequency (e.g., twice every second, three times every second, etc.).

In FIG. 5, the master card logic device 506 is a CPLD. Alternatively, the master card logic device 506 may be a DSP or any other type of logic device. Alternatively, more than one master card logic device 506 may be used. In FIG. 5, the master card logic device 506 encodes a first example pulse 518, or a first example synchronization pulse 518, on the fourth bus 300 of FIG. 3 in response to receiving the start of schedule pulse 516 from the master CPU 504. The master card logic device 506 encodes the first pulse 518 based on operation of the master clock source 508. In FIG. 5, the master clock source 508 is a clock operating at 7.3728 MHz. Alternatively, the master clock source 508 may be a clock operating at a different frequency. In FIG. 5, the first pulse 518 has a first pulse width. For example, the first pulse 518 may be a 4340 ns wide pulse (e.g., a pulse width corresponding to thirty-two 7.3728 MHz clock cycles). Alternatively, the first pulse 518 may be a pulse having a different width.

In FIG. 5, the slave I/O card logic device 510 is a CPLD. Alternatively, the slave I/O card logic device 510 may be a DSP, a PFD, or any other type of logic device. Alternatively, more than one slave I/O card logic device 510 may be used. In FIG. 5, the slave I/O card logic device 510 detects and decodes the first pulse 518 by asynchronously sampling the first pulse 518 based on operation of the slave clock source 512. In FIG. 5, the slave clock source 512 is a clock operating at 7.3728 MHz. Alternatively, the slave clock source 512 may be a clock operating at a different frequency. For example, the slave I/O card logic device 510 may decode the first pulse 518 by asynchronously sampling the first pulse 518 using the slave clock source 512.

In some examples, the slave I/O card logic device 510 determines a quantity of clock cycles, or a width (e.g., a pulse width), of the first pulse 518. In such examples, the slave I/O card logic device 510 can determine whether the width of the first pulse 518 is in a width threshold range. For example, the slave I/O card logic device 510 may determine that the width of the first pulse 518 is 32 clock cycles wide. In such examples, the slave I/O card logic device 510 can determine that the width of the first pulse 518 is in a width threshold range of 31 to 33 clock cycles. The slave I/O card logic device 510 can determine that the width of 32 clock cycles of the first pulse 518 is in the width threshold range of 31-33 clock cycles and, thus, satisfies the width threshold range.

In the illustrated example of FIG. 5, the slave I/O card logic device 510 generates and transmits a first example interrupt 520, or an example start of schedule interrupt 520, to the slave CPU 514. When the slave CPU 514 receives the first interrupt 520, the slave CPU 514 resets one or more timers (e.g., CPU timers) included in and/or otherwise associated with the slave CPU 514. For example, the slave CPU 514 may reset the one or more CPU timers associated with the slave CPU 514 to the first interrupt 520. For example, the slave CPU 514 may reset a 1 ms timer to the first interrupt 520. In such examples, the slave CPU 514 can reset the 1 ms timer to the real-time clock 502. In FIG. 5, the slave CPU 514 includes one or more processors.

Figure 6:
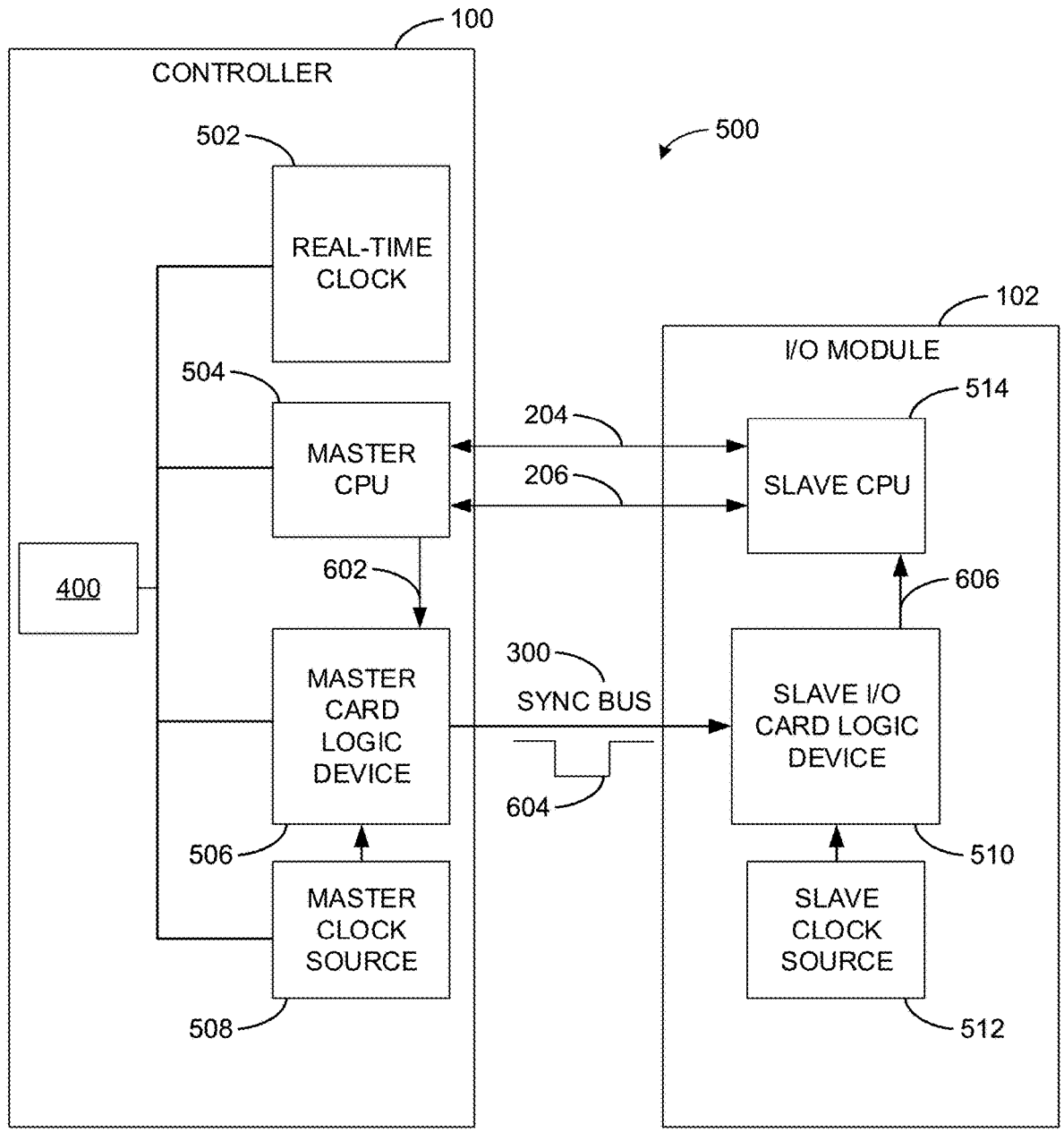
FIG. 6 depicts a block diagram of the bus synchronization system of FIG. 5 to synchronize a start of a data cycle.

FIG. 6 depicts a block diagram of the bus synchronization system 500 of FIG. 5 to synchronize a start of a data cycle. In FIG. 6, the master CPU 504 uses a value of a CPU timer of the master CPU 504 to use as a reference when initiating a data cycle of a data schedule. For example, the clock interface 410 of FIG. 4 may direct the master CPU 504 to sample the value of the CPU timer. In FIG. 6, the master CPU 504 generates and transmits an example start of cycle pulse 602 to the master card logic device 506 at a specified frequency. For example, the cycle generator 430 of FIG. 4 may direct the master CPU 504 to generate and transmit the start of schedule pulse 516 once every 600 us. Alternatively, the master CPU 504 may generate and transmit a start of schedule pulse to the master card logic device 506 at a different frequency (e.g., once every 500 us, once every 1000 us, etc.).

In FIG. 6, the master card logic device 506 encodes a second example pulse 604, or a second example synchronization pulse 604, on the fourth bus 300 of FIG. 3 in response to receiving the start of cycle pulse 602 from the master CPU 504. The master card logic device 506 encodes the second pulse 604 based on operation of the master clock source 508. In FIG. 6, the second pulse 604 has a second pulse width. For example, the second pulse 604 may be a 1085 ns wide pulse (e.g., a pulse width corresponding to eight 7.3728 MHz clock cycles). Alternatively, the second pulse 604 may be a pulse having a different width. The second pulse 604 of FIG. 6 has a smaller pulse width compared to the first pulse 518 of FIG. 5. In other examples, the second pulse 604 of FIG. 6 can have a larger pulse width compared to the first pulse 518 of FIG. 5. In FIG. 6, the slave I/O card logic device 510 detects and decodes the second pulse 604 by asynchronously sampling the second pulse 604 based on operation of the slave clock source 512. For example, the slave I/O card logic device 510 may decode the second pulse 604 by asynchronously sampling the second pulse 604 using the slave clock source 512.

In some examples, the slave I/O card logic device 510 determines a width of the second pulse 604. In such examples, the slave I/O card logic device 510 can determine whether the width of the second pulse 604 is in a width threshold range. For example, the slave I/O card logic device 510 may determine that the width of the second pulse 604 is 8 clock cycles wide. In such examples, the slave I/O card logic device 510 can determine that the width of the second pulse 604 is in a width threshold range of 7 to 9 clock cycles. The slave I/O card logic device 510 can determine that the width of 8 clock cycles of the second pulse 604 is in the width threshold range of 7-9 clock cycles and, thus, satisfies the width threshold range.

In the illustrated example of FIG. 6, the slave I/O card logic device 510 generates and transmits a second example interrupt 606, or an example start of cycle interrupt 606, to the slave CPU 514. When the slave CPU 514 receives the second interrupt 606, the slave CPU 514 resets the one or more CPU timers and one or more slot counters included in and/or otherwise associated with the slave CPU 514. For example, the slave CPU 514 may reset the one or more CPU timers and the one or more slot counters associated with the slave CPU 514 to the second interrupt 606. For example, the slave CPU 514 may reset a 1 ms timer and a slot counter to the first interrupt 520. In such examples, the slot counter can be reset to a value based on an offset. For example, the slot counter may be reset to 0 ms and then increased by an offset value of 600 us, 1200 us, etc., where the offset value is based on a slot position of the I/O module 102 in the rack 104 of FIG. 1. In such examples, the slave CPU 514 can (1) reset the 1 ms timer to the CPU timer of the master CPU 504 and (2) reset the slot counter to the CPU timer of the master CPU 504 based on the offset value associated with the I/O module 102. In response to resetting the one or more CPU timers and the one or more slot counters of the I/O module 102 to the second interrupt 606, the I/O module 102 can transmit I/O data to the controller 100 based on the one or more slot counters via the second bus 204.

Figure 7:
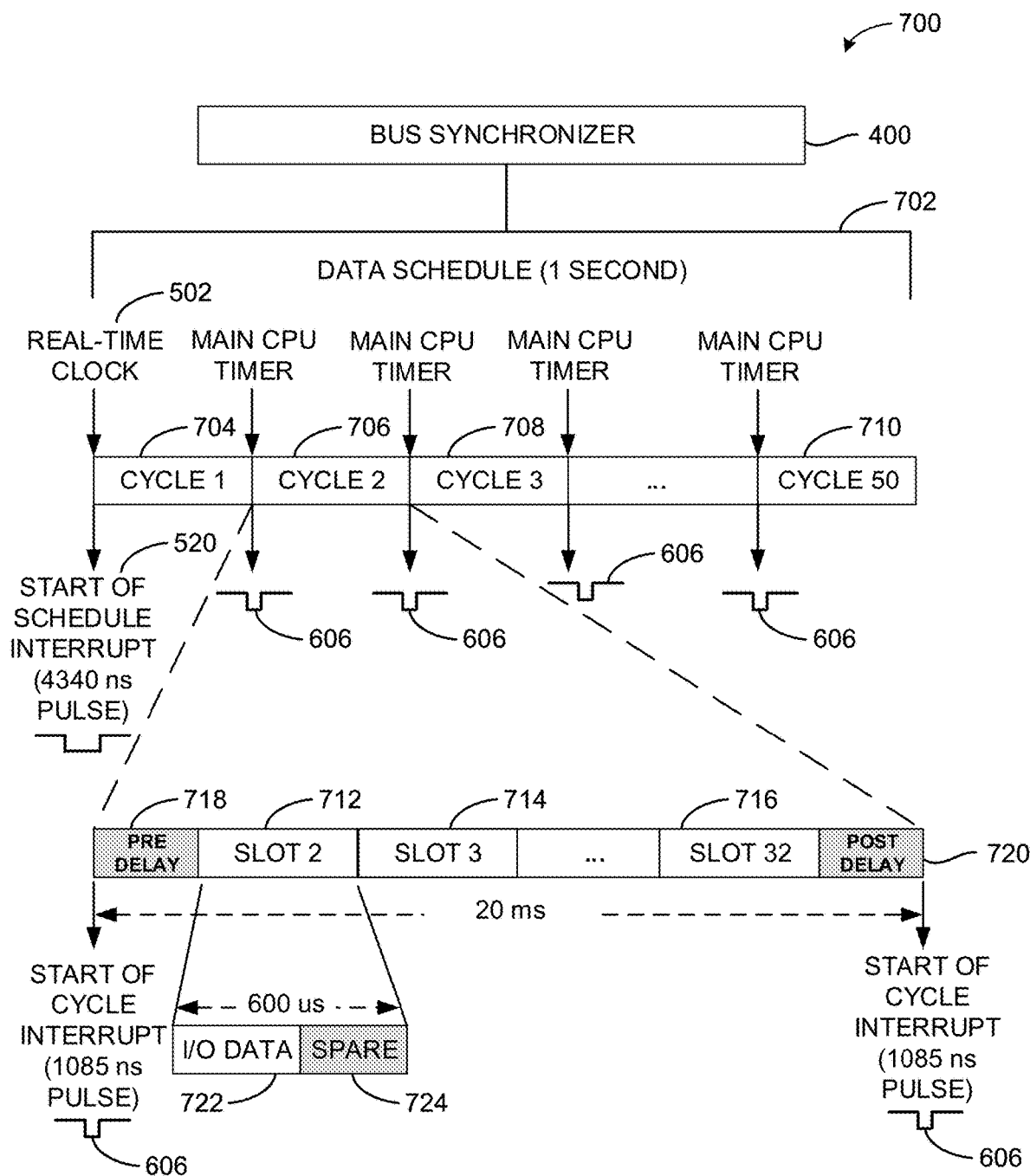
FIG. 7 depicts a timing diagram of the bus synchronizer of FIG. 4 synchronizing access to a data bus by the programmable computing devices of FIG. 1.

FIG. 7 depicts an example timing diagram 700 of the bus synchronizer 400 of FIGS. 4-6 synchronizing access of the second bus 204 of FIGS. 2-3 by the I/O modules 102 of FIGS. 1-3 and 5-6. In FIG. 7, the bus synchronizer 400 invokes an example data schedule 702 at a frequency of once per second. Alternatively, the bus synchronizer 400 may invoke the data schedule 702 at a different frequency. In FIG. 7, the data schedule 702 includes 50 example data cycles 704, 706, 708, 710 including a first example data cycle (CYCLE 1) 704, a second example data cycle (CYCLE 2) 706, a third example data cycle (CYCLE 3) 708, and a fiftieth example data cycle (CYCLE 50) 710. Alternatively, the data schedule 702 may include fewer or more than 50 data cycles.

In the illustrated example of FIG. 7, the data schedule 702 is invoked when the slave CPUs 514 of FIG. 5 of the I/O modules 102 receive the start of schedule interrupt 520 of FIG. 5 in the first data cycle 704 (e.g., at the beginning or onset of the first data cycle 704). For example, one or more CPU timers associated with the I/O modules 102 may be reset when the start of schedule interrupt 520 is received. In FIG. 7, the start of schedule interrupt 520 is based on the real-time clock 502 of FIG. 5. For example, the I/O modules 102 may reset the one or more CPU timers of the I/O modules 102 to the real-time clock 502 once every data schedule. In such examples, a time duration between synchronization events can improve I/O data throughput by reducing a period of time for which electrical signals associated with the synchronization events are accessing the buses 202, 204, 206 of FIGS. 2-3.

In FIG. 7, the data cycles 704, 706, 708, 710 are invoked when the slave CPUs 514 of the I/O modules 102 receive the start of cycle interrupt 606 of FIG. 6 in the second data cycle 706 (e.g., at the beginning or onset of the second data cycle 706). For example, the one or more CPU timers and one or more slot counters associated with the I/O modules 102 may be reset when the start of cycle interrupt 606 is received. In FIG. 7, after the fiftieth data cycle 710 is completed, the data schedule 702 is invoked again with the start of schedule interrupt 520 at the beginning of the first data cycle 704.

In FIG. 7, the start of cycle interrupts 606 are based on the CPU timer of the master CPU 504 of FIG. 5. For example, the I/O modules 102 may reset the one or more CPU timers and the one or more slot counters of the I/O modules 102 to the CPU timer of the master CPU 504 once every data cycle. In such examples, a reduction in computationally intensive synchronization operations associated with the real-time clock 502 can be reduced as the second through fiftieth data cycles 706, 708, 710 are synchronized using less computationally intensive operations associated with the CPU timer of the master CPU 504.

During the second data cycle 706, each of the I/O modules 102 coupled to Slots 2-32 of the rack 104 of FIG. 1 is given access to the second bus 204 of FIGS. 2-3 during example slots 712, 714, 716. In FIG. 7, during a first example slot time (SLOT 2) 712, the I/O module 102 coupled to Slot 2 of the first baseplate 106 transmits I/O data to the controller 100 coupled to Slot 1 of the first baseplate 106. For example, the first slot time 712 can correspond to Slot 2 of the first baseplate 106. During a second example slot time (SLOT 3) 714, the I/O module 102 coupled to Slot 3 of the first baseplate 106 transmits I/O data to the controller 100 coupled to Slot 1 of the first baseplate 106. During a thirty-first example slot time (SLOT 32) 716, the I/O module 102 coupled to Slot 32 of the fourth baseplate 112 transmits I/O data to the controller 100 coupled to Slot 1 of the first baseplate 106.

In FIG. 7, each of the second through fiftieth data cycles 706, 708, 710 includes an example pre-delay time period 718 preceding the first through thirty-first slots (SLOTS 2-32) 712, 714, 716. The second through fiftieth data cycles 706, 708, 710 each include the pre-delay time period 718 to compensate for drift associated with the real-time clock 502 of FIG. 5 not being synchronized with the CPU timer included in the master CPU 504 of FIG. 5. For example, the start of schedule interrupt 520 is based on the start of schedule pulse 516 generated using the real-time clock 502. The start of cycle interrupt 606 is based on the start of cycle pulse 602 generated using the CPU timer included in the master CPU 504. In such examples, the real-time clock 502 is not synchronized with the CPU timer and, thus, may cause clock wander, clock drift, etc., based on the non-synchronization.

To compensate for the drift, the pre-delay time period 718 is added at the beginning of each of the second through fiftieth data cycles 706, 708, 710 and an example post-delay time period 720 is added at the end of each of the second through fiftieth data cycles 706, 708, 710. For example, the pre-delay time period 718 may correspond to a first time delay of 800 us and the post-delay time period 720 may correspond to a second time delay of 600 us. In other examples, the pre-delay time period 718 and the post-delay time period 720 may have the same time delays. In FIG. 7, the time duration including the pre-delay time period 718, the second through thirty-first slots (SLOTS 2-32) 712, 714, 716, and the post-delay time period 720 is 20 ms. Alternatively, the time duration including the pre-delay time period 718, the second through thirty-first slots (SLOTS 2-32) 712, 714, 716, and the post-delay time period 720 may have a different time duration.

In the illustrated example of FIG. 7, each of the second through thirty-first slots (SLOTS 2-32) 712, 714, 716 include an example I/O data time slot 722 and an example spare time slot 724. For example, the I/O data time slot 722 can correspond to a time duration during which the I/O module 102 associated with the first slot 712 transmits I/O data to the controller 100 via the second bus 204. In such examples, the spare time slot 724 can correspond to a time buffer or a time delay between the end of the first slot 712 and the beginning of the second slot time 714 to prevent data collisions. In FIG. 7, the I/O data time slot 722 and the spare time slot 724 combined have a time duration of 600 us. For example, the I/O data time slot 722 may correspond to a time duration of 420 us and the spare time slot 724 may correspond to a time duration of 180 us. Alternatively, the I/O data time slot 722 and the spare time slot 724 may have a different combined time duration and/or different individual time durations.

Figure 8:
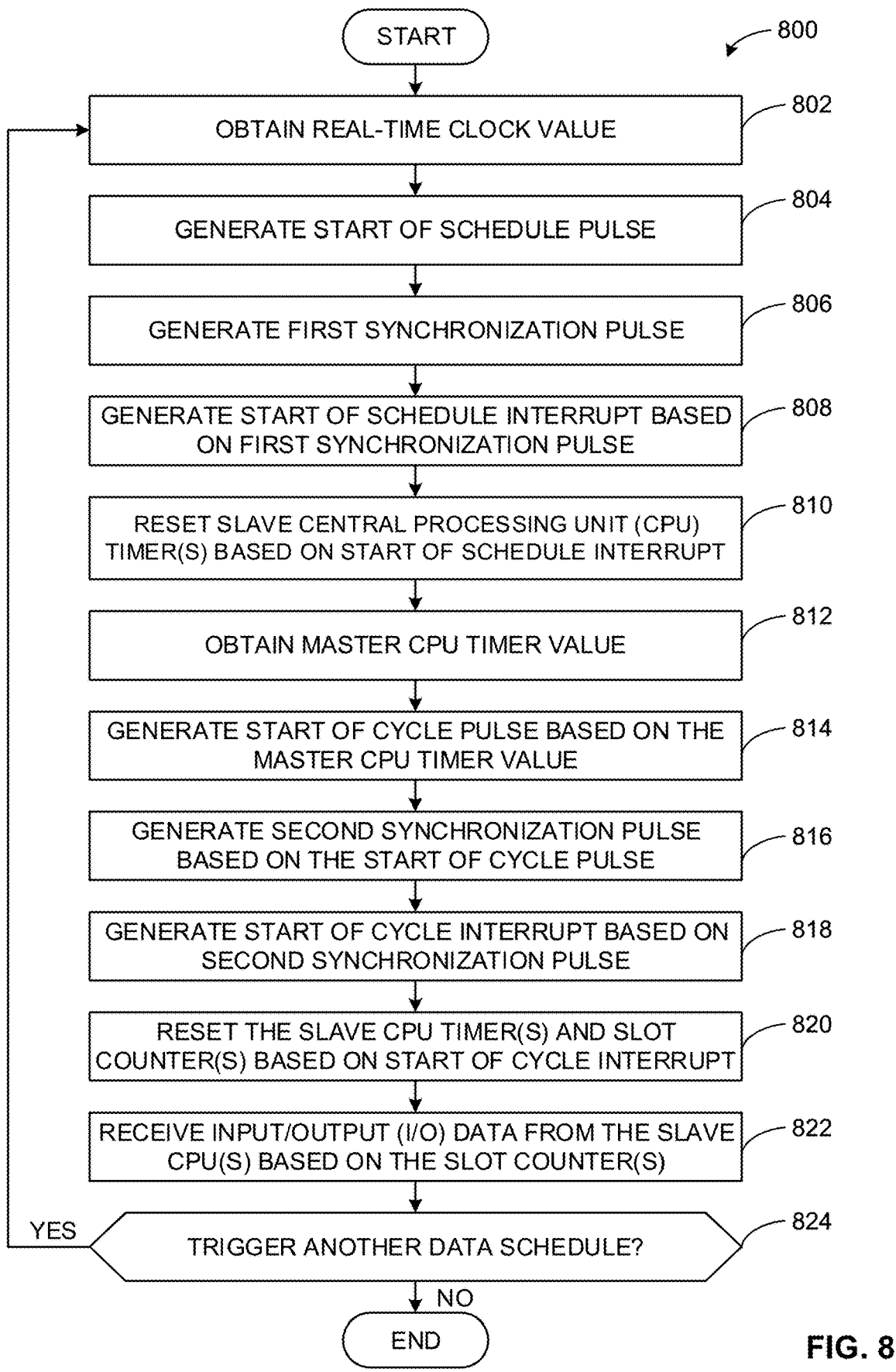
FIG. 8 is a flowchart representative of machine readable instructions which may be executed to implement the bus synchronizer of FIG. 4, and/or, more generally, the bus synchronization system of FIGS. 5-6 to synchronize transmission of I/O data from the programmable computing devices of FIG. 1.

A flowchart representative of example hardware logic, machine readable instructions, hardware implemented state machines, and/or any combination thereof for implementing the bus synchronizer 400 of FIG. 4, and/or, more generally, the bus synchronization system 500 of FIGS. 5-6 is shown in FIG. 8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example bus synchronizer 400 and/or the bus synchronization system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 8 is a flowchart representative of example machine readable instructions 800 which may be executed to implement the bus synchronizer of FIG. 4, and/or, more generally, the bus synchronization system of FIGS. 5-6 to synchronize transmission of I/O data from the I/O modules 102 of FIGS. 1-3 and 5-6. The machine readable instructions 800 of FIG. 8 begin at block 802, at which the controller 100 (FIGS. 1-3 and 5-6) obtains a real-time clock value. For example, the clock interface 410 (FIG. 4) may direct the master CPU 504 (FIG. 5) to obtain a clock value from the real-time clock 502 (FIG. 5).

At block 804, the controller 100 generates a start of schedule pulse. For example, the schedule generator 420 (FIG. 4) may invoke the master CPU 504 to generate the start of schedule pulse 516 (FIG. 5) based on the value of the real-time clock 502 to trigger and/or otherwise initiate a data schedule such as the data schedule 702 of FIG. 7.

At block 806, the controller 100 generates a first synchronization pulse. For example, the schedule generator 420 may direct the master card logic device 506 to generate the first synchronization pulse 518 (FIG. 5) based on operation of the master clock source 508 (FIG. 5). In such examples, the master card logic device 506 can transmit the first synchronization pulse 518 to the I/O modules 102 via the fourth bus 300 (FIG. 3).

At block 808, the I/O modules 102 generate a start of schedule interrupt based on the first synchronization pulse. For example, the slave I/O card logic device 510 (FIG. 5) may generate the start of schedule interrupt 520 (FIG. 5) in response to detecting and decoding the first synchronization pulse 518 on the fourth bus 300. In such examples, the slave I/O card logic device 510 can transmit the start of schedule interrupt 520 to the slave CPU 514 (FIG. 5).

At block 810, the I/O modules 102 reset slave CPU timer(s) based on the start of schedule interrupt. For example, the slave CPU 514 can reset one or more CPU timers associated with the slave CPU 514 by synchronizing the one or more CPU timers to the start of schedule interrupt 520.

At block 812, the controller 100 obtains a master CPU timer value. For example, the clock interface 410 may instruct the master CPU 504 to obtain a value of a CPU timer included in and/or otherwise associated with the master CPU 504.

At block 814, the controller 100 generates a start of cycle pulse based on the master CPU timer value. For example, the cycle generator 430 (FIG. 4) may invoke the master CPU 504 to generate the start of cycle pulse 604 (FIG. 6) based on the value of the CPU timer of the master CPU 504.

At block 816, the controller 100 generates a second synchronization pulse based on the start of cycle pulse. For example, the cycle generator 430 may direct the master card logic device 506 to generate the second synchronization pulse 604 (FIG. 6) based on operation of the master clock source 508. In such examples, the master card logic device 506 can transmit the second synchronization pulse 604 to the I/O module 102 via the fourth bus 300.

At block 818, the I/O modules generate a start of cycle interrupt based on the second synchronization pulse. For example, the slave I/O card logic device 510 may generate the start of cycle interrupt 606 (FIG. 6) in response to detecting the second synchronization pulse 604 on the fourth bus 300. In such examples, the slave I/O card logic device 510 can transmit the start of cycle interrupt 606 to the slave CPU 514.

At block 820, the I/O modules 102 reset the slave CPU timer(s) and slot counter(s) based on the start of cycle interrupt. For example, the slave CPU 514 can reset the one or more CPU timers and one or more slot counters associated with the slave CPU 514. In such examples, the slave CPU 514 can perform the reset by synchronizing the one or more CPU timers and the one or more slot counters to the start of cycle interrupt 606.

At block 822, the controller 100 receives I/O data from the slave CPU(s) based on the slot counter(s). For example, the data interface 440 may invoke the master CPU 504 to detect I/O data on the second bus 204 from the I/O modules 102. In such examples, each of the I/O modules 102 can transmit I/O data based on a slot counter associated with each of the I/O modules 102. Advantageously, by synchronizing the one or more CPU timers and the one or more slot counters associated with the I/O modules 102, each of the I/O modules 102 can transmit data to the controller via a shared bus such as the second bus 204 without data collisions (e.g., data collisions caused by clock drift, clock wander, etc.).

At block 824, the controller 100 determines whether to trigger another data schedule. For example, the clock interface 410 may instruct the master CPU 504 to obtain another value of the real-time clock 502 to initiate another data schedule such as the data schedule 702 of FIG. 7. If, at block 824, the controller 100 determines to trigger another data schedule, control returns to block 802 to obtain another real-time clock value, otherwise the machine readable instructions 800 of FIG. 8 conclude.

Figure 9:
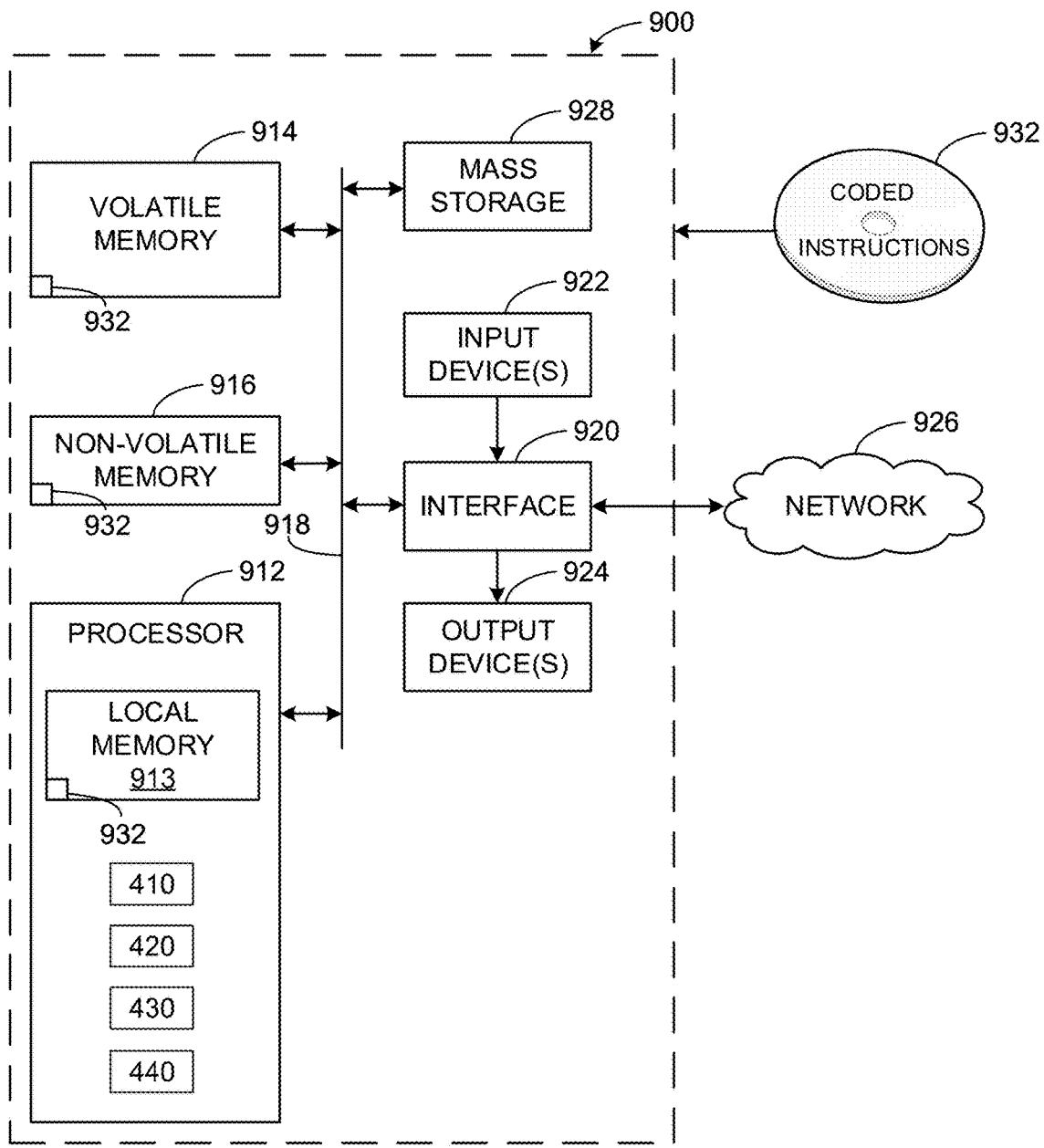
FIG. 9 is a block diagram of an example processing platform structured to execute the instructions of FIG. 8 to implement the example bus synchronizer of FIG. 4.

FIG. 9 is a block diagram of an example processor platform 900 structured to execute the instructions of FIG. 8 to implement the bus synchronizer 400 of FIGS. 4-7. The processor platform 900 can be, for example, a programmable computing device, logic circuit, controller, RTU, or input/output module, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example clock interface 410, the schedule generator 420, the cycle generator 430, and the data interface 440 of FIG. 4.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 8 may be stored in the mass storage device 928, in the volatile memory 914, in the non-volatile memory 916, and/or on a removable non-transitory computer readable storage medium such as a CD or DVD.

From the foregoing, it will be appreciated that example systems, methods, apparatus, and articles of manufacture have been disclosed that synchronize access to a data bus. By implementing a TDMA I/O data bus using an asynchronous, variable data rate, RS-485 interface, power can be conserved in low-power applications. For example, the variable data rate facilitates data rate flexibility by providing higher data rates in high-power applications and lower data rates in low-power applications using the same hardware in both applications. By implementing the TDMA I/O data bus using a dual synchronization approach, accurate transfer of real-time I/O data can be achieved at the highest hardware-supported data rate. For example, the dual synchronization approach allows a system utilizing the approach to run longer in between real-time clock based synchronizations which, in turn, reduces the system overhead in the TDMA I/O data bus. The disclosed systems, methods, apparatus, and articles of manufacture improve the efficiency of using a computing device by reducing the quantity of time that synchronization-related electrical signals are occupying the TDMA I/O data bus and, thus, increasing a quantity of I/O data transmitted using the TDMA I/O data bus. The disclosed systems, methods, apparatus, and articles of manufacture are accordingly directed to one or more improvement (s) in the functioning of a computer.

Although certain example systems, methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A system comprising:
   a first computing device to:
      transmit a first synchronization pulse to second computing devices using a first bus, the first synchronization pulse based on a real-time clock associated with the first computing device, the first synchronization pulse to synchronize first timers of the second computing devices to trigger a data schedule including one or more data cycles; and
      transmit a second synchronization pulse to the second computing devices using the first bus, the second synchronization pulse based on a second timer associated with the first computing device, the second synchronization pulse to synchronize ones of the first timers and slot counters of the second computing devices to trigger the one or more data cycles; and
   the second computing devices to transmit data to the first computing device using a second bus during the one or more data cycles, where each of the one or more data cycles is assigned to a corresponding one of the second computing devices, the second bus different from the first bus.

2. The system of claim 1, wherein the first computing device is to generate the first synchronization pulse by:
   generating, with at least one processor, a start of schedule pulse based on the real-time clock;
   encoding, with a complex programmable logic device (CPLD), a first quantity of clock cycles of a clock source; and
   generating, with the CPLD, the first synchronization pulse having a first pulse width based on the first quantity of clock cycles.

3. The system of claim 2, wherein the first computing device is to generate the second synchronization pulse by:
generating, with the at least one processor, a start of cycle pulse based on a timer associated with the first computing device;
encoding, with the CPLD, a second quantity of clock cycles of the clock source, the first quantity greater than the second quantity; and
generating, with the CPLD, the second synchronization pulse having a second pulse width based on the second quantity of clock cycles.

4. The system of claim 1, wherein the first computing device is to generate at least one of the first synchronization pulse or the second synchronization pulse using a complex programmable logic device or a digital signal processor.

5. The system of claim 1, wherein each of the one or more data cycles includes a first time delay followed by one or more slots and the one or more slots followed by a second time delay, the first time delay greater than the second time delay.

6. The system of claim 1, wherein the data corresponds to I/O data associated with one or more field devices in a process control environment.

7. The system of claim 1, wherein the second bus corresponds to an RS-485 electrical interface.

8. A non-transitory computer readable storage medium comprising instructions which, when executed, cause a machine to at least:
transmit a first synchronization pulse from a first computing device to second computing devices using a first bus, the first synchronization pulse based on a real-time clock associated with the first computing device;
synchronize first timers of the second computing devices to the first synchronization pulse to trigger a data schedule including one or more data cycles;
transmit a second synchronization pulse from the first computing device to the second computing devices using the first bus, the second synchronization pulse based on a second timer associated with the first computing device;
synchronize ones of the first timers and slot counters of the second computing devices to the second synchronization pulse to trigger the one or more data cycles; and
transmit data from the second computing devices to the first computing device using a second bus during the one or more data cycles, where each of the one or more data cycles is assigned to a corresponding one of the second computing devices, the second bus different from the first bus.

9. The non-transitory computer readable storage medium of claim 8, further including instructions which, when executed, cause the machine to at least:
generate a start of schedule pulse based on the real-time clock;
encode a first quantity of clock cycles of a clock source; and
generate the first synchronization pulse having a first pulse width based on the first quantity of clock cycles.

10. The non-transitory computer readable storage medium of claim 9, further including instructions which, when executed, cause the machine to at least:
generate a start of cycle pulse based on a timer associated with the first computing device;
encode a second quantity of clock cycles of the clock source, the first quantity greater than the second quantity; and
generate the second synchronization pulse having a second pulse width based on the second quantity of clock cycles.

11. The non-transitory computer readable storage medium of claim 8, wherein at least one of the first synchronization pulse or the second synchronization pulse are generated using a complex programmable logic device or a digital signal processor.

12. The non-transitory computer readable storage medium of claim 8, wherein each of the one or more data cycles includes a first time delay followed by one or more slots and the one or more slots followed by a second time delay, the first time delay greater than the second time delay.

13. The non-transitory computer readable storage medium of claim 8, wherein the data corresponds to I/O data associated with one or more field devices in a process control environment.

14. The non-transitory computer readable storage medium of claim 8, wherein the second bus corresponds to an RS-485 electrical interface.

15. A method comprising:
transmitting a first synchronization pulse from a first computing device to second computing devices using a first bus, the first synchronization pulse based on a real-time clock associated with the first computing device;
synchronizing first timers of the second computing devices to the first synchronization pulse to trigger a data schedule including one or more data cycles;
transmitting a second synchronization pulse from the first computing device to the second computing devices using the first bus, the second synchronization pulse based on a second timer associated with the first computing device;
synchronizing ones of the first timers and slot counters of the second computing devices to the second synchronization pulse to trigger the one or more data cycles; and
transmitting data from the second computing devices to the first computing device using a second bus during the one or more data cycles, where each of the one or more data cycles is assigned to a corresponding one of the second computing devices, the second bus different from the first bus.

16. The method of claim 15, wherein the first synchronization pulse is generated by:
generating a start of schedule pulse based on the real-time clock;
encoding a first quantity of clock cycles of a clock source; and
generating the first synchronization pulse having a first pulse width based on the first quantity of clock cycles.

17. The method of claim 16, wherein the second synchronization pulse is generated by:
generating a start of cycle pulse based on a timer associated with the first computing device;
encoding a second quantity of clock cycles of the clock source, the first quantity greater than the second quantity; and
generating the second synchronization pulse having a second pulse width based on the second quantity of clock cycles.

18. The method of claim 15, wherein at least one of the first synchronization pulse or the second synchronization pulse are generated using a complex programmable logic device or a digital signal processor.

19. The method of claim 15, wherein each of the one or more data cycles includes a first time delay followed by one or more slots and the one or more slots followed by a second time delay, the first time delay greater than the second time delay.

20. The method of claim 15, wherein the second bus corresponds to an RS-485 electrical interface.

* * * * *